INVENTORS.
JAMES A. CLARK
FRANK H. FERGUSON
BY
Harry E. Seidel
ATTORNEY

Patented May 13, 1952

2,596,654

UNITED STATES PATENT OFFICE 2,596,654

MAGNETIC CLUTCH

James Atkins Clark, Takoma Park, and Frank Harvey Ferguson, Forestville, Md., assignors to Ahrendt Instrument Company, Washington, D. C.

Application February 15, 1949, Serial No. 76,604

4 Claims. (Cl. 192—21.5)

This invention relates to magnetic connecting means for shafts.

Magnetic clutches and brakes are well-known in the art but have a limited use because of critical adjustments due to wear of parts. Furthermore, such clutches and brakes have complicated structures and are impracticable for economical manufacture.

An object of the invention is the provision of a simple magnetic clutch wherein a driving shaft is coupled to an idle shaft by rotatable members formed of magnetic materials and acting as bearings for the coordinated ends of the shafts when a magnetic flux is passed through the rotatable members.

Another object of the invention is the provision of a magnetic clutch wherein an idle shaft in longitudinal alignment with a driving shaft is connected to the driving shaft by a plurality of rotatable bearings of magnetic materials when said bearings are attracted mutually upon the application of a magnetic flux, said bearings being confined in circumscribing relation on an abutting end of one of the shafts by a cup-shaped member rigid with one of the shafts, the magnetic flux being controlled at will for varying the torque transmitted to the idle shaft from the driving shaft.

A further object of the invention is the provision of a clutch wherein a driving shaft and an idle shaft engage with positive but free-rolling contact with needle bearings formed of magnetic materials, said bearings being so aligned that the controllable magnetic flux of an electromagnetic core will cause variations in the degree of frictional sliding contact or binding between the needle bearings thereby varying the torque transmitted to the idle shaft.

Another object of the invention is the provision of a braking means wherein a moving member has its speed of motion controlled by the action of a magnetic flux on bearings formed of magnetic materials and cooperatively associated with the moving member and a stationary member, said bearings being freely rotatable during the absence of the magnetic flux.

The invention is best understood from a consideration of the following detailed description in connection with the accompanying drawings forming part of the specification; nevertheless, it is to be borne in mind that the invention is not confined to the disclosure but is susceptible of such changes and modifications as shall define no material departure from the salient features of the invention as expressed in the appended claims.

These objects are attained by a mechanism, illustrated in the accompanying drawings, in which—

Figure 3:
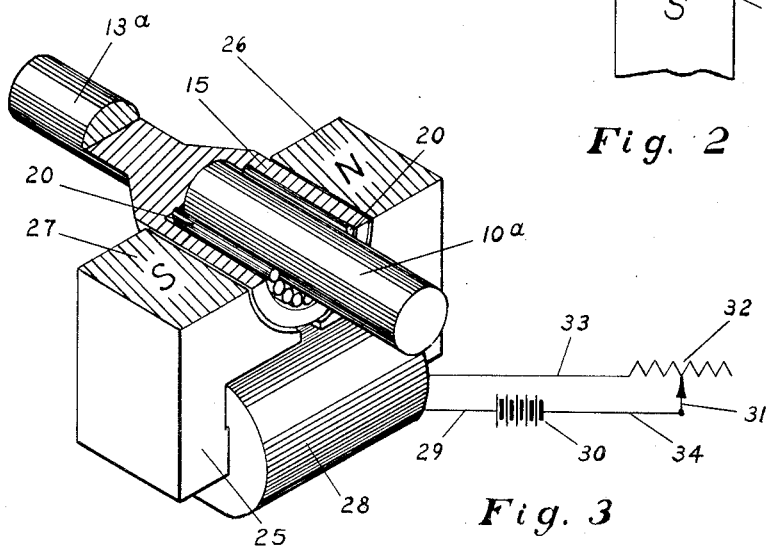
Figure 4:
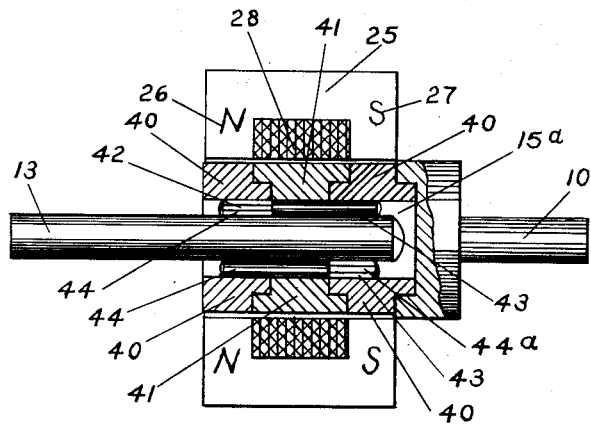
Figure 5:
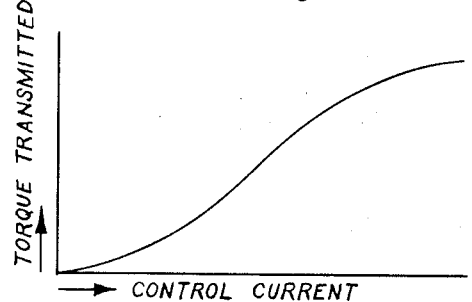
Figure 6:
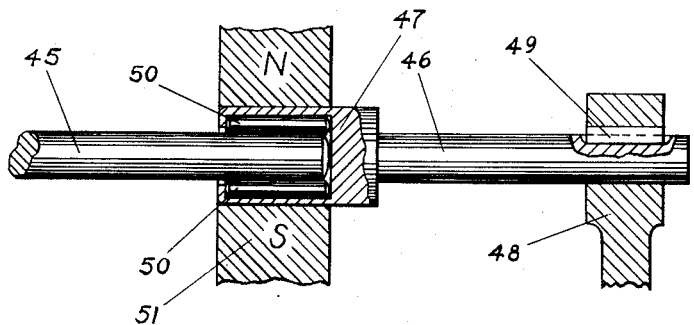

Figure 3 is a view in perspective and partly in section of a magnetic clutch and an electric circuit therefor showing a slightly modified arrangement of the driving and driven shafts, Figure 4 is a longitudinal vertical section showing another modified form of the clutch, Figure 5 is a curve representing the torque transmitted from a driving member to a driven member as a function of control current in the magnetizing coil, and Figure 6 is a longitudinal vertical section showing our clutch converted into a braking means.

Figure 1:
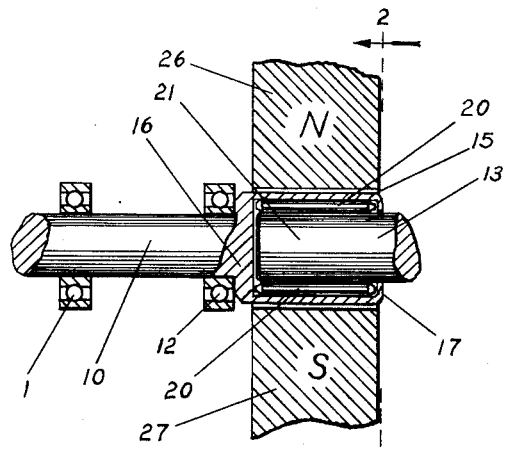
Figure 1 is a longitudinal vertical section of our magnetic clutch.
Figure 2:
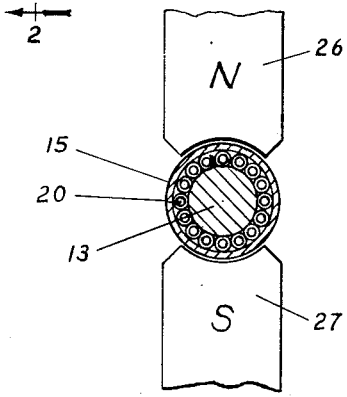
Figure 2 is a transverse vertical section taken along the line 2—2 of Figure 1.

Referring now particularly to Figures 1 and 2, 10 designates a driving shaft which in turn may be rotated by any suitable prime mover (not shown). Spaced bearings 11 and 12 support the driving shaft in longitudinal axial alignment with a driven shaft 13 which transmits power to an operating mechanism (not shown). Several specific examples of such mechanisms may be a shaft for causing rotation of signal devices or relays requiring quick response.

A thin cylindrical shell 15 has one end attached to an enlarged portion 16 of the driving shaft 10. The shell is manufactured from magnetic materials and it will be noted from Figure 1 that it is in integral formation with the shaft 10. However, the shell may be formed separately from the shaft and firmly attached thereto in any approved manner. The outer free end of shell or hollow portion of the driving shaft may have an inturned annular flange 17.

Rollers 20 which we designate particularly as needle bearings because of the small diameters, are received by the shell 15 and embrace circumferentially the free end 21 of the shaft 13. Lubricant is supplied in any approved manner to the roller bearings which may serve normally as bearing supports for the driven member. The bearings, due to the fact that they are manufactured from magnetic materials, and have relatively small circumferential clearance between rollers play an important part in the functioning of the magnetic clutch. The thickness of the walls of the hollow portion 15 of the shaft 10 may also be a contributing factor in the efficient operation of the clutch. The small clearance is substantially the same as is found in well-constructed roller bearings of standard makes, with the rollers for all practical purposes, being in contact with each other and also being in contact with the shell 15 and shaft 13.

An electromagnet generally designated by the numeral 25 (Figures 1 to 3) includes the usual north pole 26, a south pole 27 and a magnetic coil 28. The ends of the poles are curved to conform to the curvature of the shell, cup or hollow portion 15 of the shaft 10 with the curved surfaces of the poles being in close association with the outer surface of said shell to form an air gap.

The electric circuit in which is embodied the magnetic coil 28, includes a wire 29 connecting a source of current 30 with one end of said coil and an arm 31, movable over a resistance 32. This resistance, which in turn is connected to the other end of the coil by a wire 33, is connected with the source of current by a wire 34 and the arm 31.

The shell may be attached to the shaft 13a (Figure 3) for confining the bearings 20 in circumscribed relation on the free end of the shaft 10a. In other words, it is immaterial, for the purposes of this construction whether the shaft 10 or 10a be the driving or driven shaft or whether the shell is rigid with the shaft 10 or 10a or the shaft 13 or 13a.

An alternative form whereby the thin wall construction illustrated in Figure 1 may be avoided, is shown in Figure 4 wherein the hollow portion 15a of the shaft 10 is formed of alternate rings 40 of magnetic material and ring 41 of non-magnetic material so that a magnetic shunt is not offered to the flux. In addition, the adjacent ends 42 of alternate rollers 43 have been reduced in diameter while the ends 44a of the other rollers 44 are also reduced so that the flux passing from the north pole piece 26 to the south pole piece 27 must pass between adjacent rollers 43 and 44 thereby tending to bind the rollers to each other more thoroughly. More specifically, the air gap created by the reduced ends 42 and 44a of the respective rollers 43 and 44 will cause the flux to pass from the pole 26 through a ring 40 and through the non-reduced ends of the rollers 44 thence to the adjacent rollers 43 through a ring 40 and to the pole 27 through the non-reduced ends of the rollers 43. Thus, the lines of force of the magnetic field take the paths of least reluctance. The rings 40 and 41 are pressed onto each other with one of the rings 40 being pressed onto the member 15 so that said rings will revolve with the shaft 10.

The operation of the magnetic clutch is as follows. The shaft 10 may be considered the driving shaft which is rotated by a prime mover (not shown) while the shaft 13 is idle but adapted to operate any type of mechanism when the transmission is active. When the electric circuit (Figure 3) is closed by the proper position of the arm 31, the magnetic flux will flow through the shell 15 and cause the rolling members 20 to bind the shell 15 to the end 21 of the shaft. It has been found in actual practice that the best results have been obtained when the magnetic flux is passed through the shell, the bearings, and shaft end surrounded by said bearings so that the bearings will not only be attracted to each other but will be attracted to the cup and shaft end.

It is understood that the degree of binding is dependent upon the magnetic intensity which increases in proportion with the current. The magnetic intensity is therefore determined by the adjustable resistance 32 which controls the current to the magnetic coil 28. Thus, as the current is decreased sufficiently there will be slippage in the clutch elements and the torque transmitted will be decreased.

Figure 5 illustrates diagrammatically the variation in transmitted torque between the shell 15 and shaft end 21 as a function of the controlled current. The shape of this curve as is well-known, may be altered by the selection of various magnetic constructions and by the properties of the magnetic materials employed in the transmission as well as in constructional features thereby eliminating an air gap by the use of a rotatable core and coil supplied with current by means of slip rings and collector brushes.

It will be seen from the above description that the magnetic transmission is simply constructed and does not require any additional medium or element to initiate the binding of the rollers. In other words, the conventional rolling members 20 having a uniform shape and size and housed within a casing 15 rigid with a driving or driven shaft, form bearings for the free end of a second shaft with means, such as an electromagnet or a permanent magnet, for passing a magnetic flux through the casing, bearings and the free end of the second shaft.

In Figure 6 is illustrated broadly, one form of a magnetically controlled braking means which is a simple conversion of the magnetic clutch illustrated in Figure 3. In this form shaft 45 is driven while shaft 46 is held stationary as is the cup-shaped member 47 which is rigid with the shaft 46. The last-mentioned shaft may be keyed to a stationary bracket 48 as shown at 49 or some other form of clamping means may be employed. The member 47 confines the bearings 50 to the free end of the shaft 45. On the other hand the cup-shaped member 47 may be rigid with the shaft 45 as shown in Figure 1. The magnet as will be appreciated, may be held stationary and the bearing surfaces of the member 47 may be integral with the pole pieces.

The operation of the braking device is identical with that of the clutches described supra. When a magnetic flux is caused to flow through the bearings 50 by the magnet 51, the speed of the shaft 45 will be decreased in accordance with current passing through the coils of the magnet. In other words the shaft may be stopped or the speed may be progressively decreased, at will.

The casing, cup-shaped member, or cylindrical enlargement employed in all of the constructions and rigid with one of the pair of longitudinally aligned shafts which may be a driving or driven or a stationary element, is adapted to confine the roller bearings, onto the other element. Said bearings create a frictional drag between the pair of elements when a magnetic flux is passed through the bearings.

What is claimed:

1. In a device of the class described, a member, a second member associated in longitudinal axial alignment with the first member, one of said members constituting a driven element, a casing rigid with one of the members and embracing a portion of the other member, roller bearings in contact with each other formed of magnetic material and confined by the casing on the embraced portion of said other member, and means passing a magnetic flux through the bearings to cause said bearings to create a frictional drag between the members, the portions of said members embracing the roller bearings being made of magnetic materials and in contact with said bearings.

2. A magnetic clutch comprising a pair of longitudinally aligned shafts formed of magnetic materials, an end of one shaft received within an adjacent end of the other shaft, free-rolling bearings arranged in a single circumferential row, confined in contact with the bearing surfaces of the associated ends of the shafts and formed of magnetic materials, the roller bearings being in contact with each other and in contact with the shaft ends, an end of each of alternate bearings and an oppositely disposed end of each of the other bearings being reduced in diameter, and means causing a magnetic flux to flow through the bearings, the reduced ends of the bearings providing air gaps at said ends so that the flux will pass through adjacently disposed bearings.

3. A magnetic clutch comprising a pair of shafts in longitudinal axial alignment, a conventional roller bearing including roller bearings and a casing fixed to an end of one of the shafts for the reception of the free end of the other shaft and for confining the rollers of the bearings circumferentially around the enclosed end of the second mentioned shaft, the shaft ends, as well as the roller bearings being formed of magnetic materials, and means causing a magnetic flux to pass through the roller bearing, said bearings being formed of magnetic materials to cause a frictional drag between the shafts, the roller bearings being substantially in contact with each other and in contact with the shaft ends.

4. A magnetic clutch comprising a pair of longitudinally alined shafts formed of magnetic materials, a free end of one shaft being hollow and receiving an adjacent free end of the other shaft, free-rolling members disposed in substantial contact with each other between the bearing surfaces of the associated ends of the shafts, each rolling member being substantially in contact at diametrically opposite points with said bearing surfaces of the shaft ends and formed of magnetic materials, the hollow end of the first mentioned shaft cooperating with the rolling members to act as bearings for the adjacent end of the other shaft and to form the sole support for said end, and means causing a magnetic flux to be passed through the rolling members and the adjacent shaft ends to create a frictional drag between the shafts.

JAMES ATKINS CLARK.
FRANK HARVEY FERGUSON.

REFERENCES CITED

The following references are of record in the file of this patent:

UNITED STATES PATENTS

| Number | Name | Date |
|---|---|---|
| 2,300,223 | Hottenroth, Jr. | Oct. 27, 1942 |
| 2,417,850 | Winslow | Mar. 25, 1947 |

OTHER REFERENCES

National Bureau of Standards Technical Report 1213, Apr. 1948.